US007120766B2

(12) United States Patent
Ash et al.

(10) Patent No.: US 7,120,766 B2
(45) Date of Patent: Oct. 10, 2006

(54) APPARATUS AND METHOD TO INITIALIZE INFORMATION DISPOSED IN AN INFORMATION STORAGE AND RETRIEVAL SYSTEM

(75) Inventors: Kevin J. Ash, Tucson, AZ (US); Susan K. Candelaria, Tucson, AZ (US); Joseph S. Hyde, II, Tucson, AZ (US); Thomas C. Jarvis, Tucson, AZ (US); William F. Micka, Tucson, AZ (US); Kenneth W. Todd, Tucson, AZ (US); Gail A. Spear, Tucson, AZ (US)

(73) Assignee: Inernational Business Machines Corporation, Armonk, NY (US)

( * ) Notice: Subject to any disclaimer, the term of this patent is extended or adjusted under 35 U.S.C. 154(b) by 354 days.

(21) Appl. No.: 10/743,664

(22) Filed: Dec. 22, 2003

(65) Prior Publication Data

US 2005/0138318 A1 Jun. 23, 2005

(51) Int. Cl.
*G06F 12/12* (2006.01)

(52) U.S. Cl. .................. 711/159; 711/154; 711/155; 711/156

(58) Field of Classification Search ............. None
See application file for complete search history.

(56) References Cited

U.S. PATENT DOCUMENTS

| 4,729,091 A | * | 3/1988 | Freeman et al. ............ 711/147 |
| 4,814,904 A | | 3/1989 | Shigihara et al. ............ 360/60 |
| 5,339,199 A | * | 8/1994 | Ogawa ....................... 386/106 |
| 5,359,465 A | | 10/1994 | Miyadera ................... 360/35.1 |
| 5,497,238 A | | 3/1996 | Sato et al. .................. 358/310 |
| 6,857,041 B1 | * | 2/2005 | LeClerg ...................... 711/103 |

* cited by examiner

*Primary Examiner*—T Nguyen
(74) *Attorney, Agent, or Firm*—Dale F Regelman

(57) ABSTRACT

A method to initialize information disposed in an information storage and retrieval system comprising a data cache and one or more information storage media comprising a plurality of addresses. The method receives an initialization command, where that initialization command comprises a range of addresses and, optionally, an initialization pattern, where the plurality of addresses includes the range of addresses. The method forms and saves state information, where that state information includes the initialization pattern, and generates and saves a plurality of indicators, where that plurality of indicators includes an indicator for each track comprising the range of addresses. The method sets each of those indicators to a first value thereby indicating special handling, and provides an ending status signal, such that the receiving step, forming step, generating step, setting step, and providing step are performed substantially synchronously.

19 Claims, 7 Drawing Sheets

APPARATUS AND METHOD TO INITIALIZE INFORMATION DISPOSED IN AN INFORMATION STORAGE AND RETRIEVAL SYSTEM

FIELD OF THE INVENTION

The invention relates to an apparatus and method to initialize information disposed in an information storage and retrieval system comprising a data cache and one or more information storage media comprising a plurality of addresses. In certain embodiments, the invention relates to an apparatus and method to erase information disposed in an information storage and retrieval system.

BACKGROUND OF THE INVENTION

Information storage and retrieval systems are used to store information provided by one or more host computer systems. Such information storage and retrieval systems receive requests to write information to one or more information storage devices, and requests to retrieve information from those one or more information storage devices. Upon receipt of write request, the system stores information received from a host computer in a data cache. In certain implementations, a copy of that information is also stored in a nonvolatile storage device. Upon receipt of a read request, the system recalls information from the one or more information storage devices and moves that information to the data cache.

Thus, the system is continuously moving information to and from storage devices, and to and from the data cache. One or more communication links interconnect one or more device adapters and the one or more information storage devices.

Over time, some of the information written to the one or more information storage devices is changed, i.e. updated, and revised files are separately saved. Thus, an information storage and retrieval system may, at certain times, store both historical data, i.e. superceded data, along with current data. To free up storage space in the information storage and retrieval system, the historical data may be erased.

Using prior art methods, erasing data may require a lengthy interconnect time interval for a host computer. With the need for "24×7" data processing, what is needed is a method to erase data, where that method does not tie up host computer resources.

SUMMARY OF THE INVENTION

Applicants' invention includes an apparatus and method to initialize information disposed in an information storage and retrieval system comprising a data cache and one or more information storage media comprising a plurality of data addresses. Applicants' method receives an initialization command, where that initialization command comprises a range of addresses, and optionally, and an initialization pattern, where the plurality of data addresses includes the range of addresses.

The method forms and saves state information, where that state information includes the initialization pattern, and generates and saves a plurality of indicators, where that plurality of indictors includes an indicator for each address comprising the range of addresses. The method sets each of those indicators to a first value thereby indicating special handling, and provides an ending status signal, such that the receiving step, forming step, generating step, setting step, and providing step are performed substantially synchronously.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures. The invention will be described as embodied in a data storage and retrieval system comprising one or more volumes and a data cache. In certain embodiments, the one or more volume comprise one or more logical volumes. In certain embodiments, the one or more volumes comprise one or more physical volumes.

Figure 1:
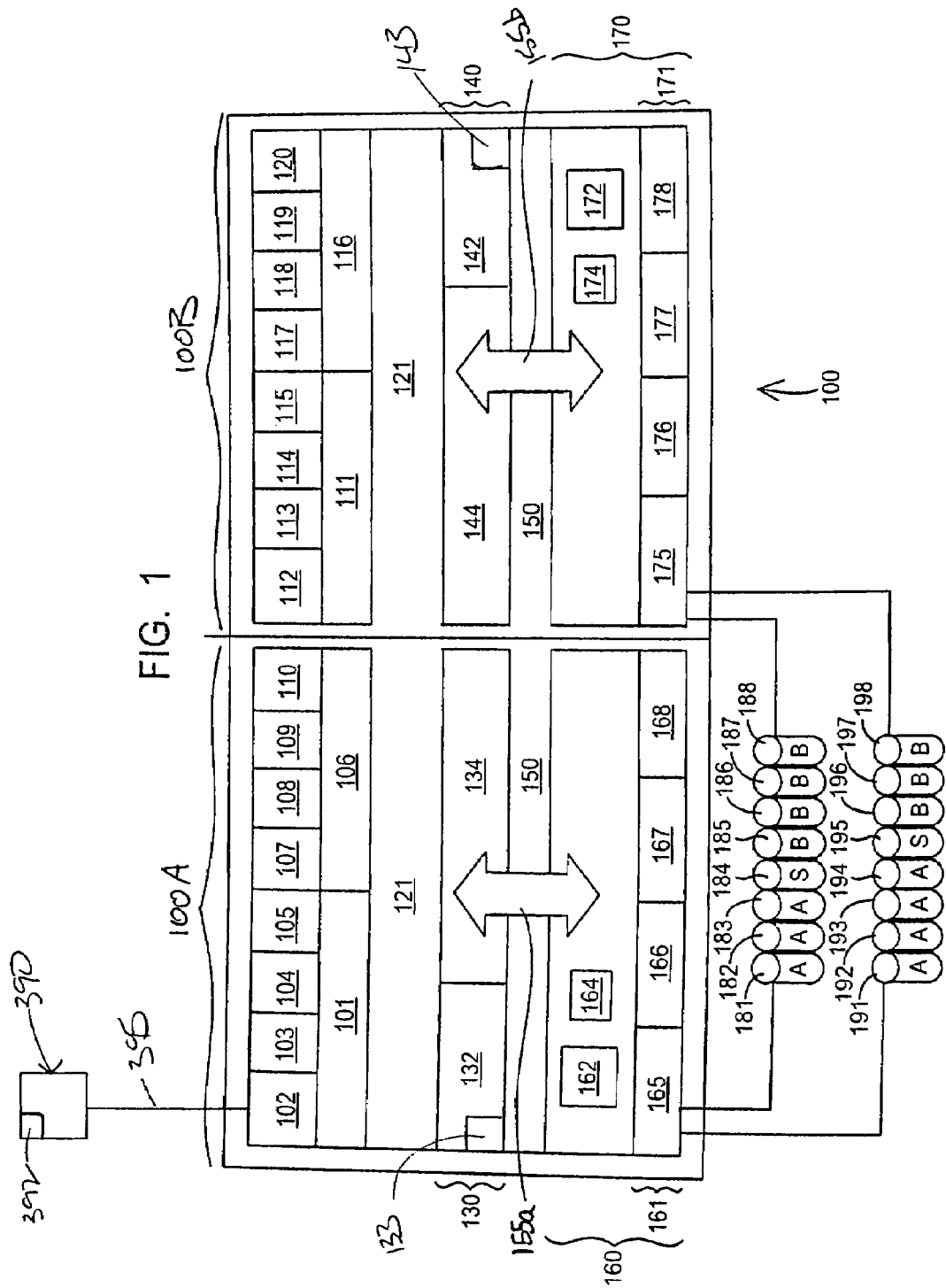
FIG. 1 is a block diagram showing the components of Applicants' data storage and retrieval system.

Referring now to FIG. 1, Applicants' information storage and retrieval system 100 includes a first cluster 100A and a second cluster 100B. Each cluster includes a processor portion 130/140 and an input/output portion 160/170. Internal PCI buses in each cluster are connected via a Remote I/O bridge 155a/155b between the processor portions 130/140 and device I/O portions 160/170, respectively.

Information storage and retrieval system 100 further includes a plurality of host adapters 102–105, 107–110, 112–115, and 117–120, disposed in four host bays 101, 106, 111, and 116. Each host adapter may comprise one or more Fibre Channel ports, one or more FICON ports, one or more ESCON ports, or one or more SCSI ports. Each host adapter is connected to both clusters through one or more Common Platform Interconnect buses 121 and 150 such that each cluster can handle I/O from any host adapter.

Processor portion 130 includes processor 132 and cache 134. Processor portion 140 includes processor 142 and cache 144. I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two arrays, namely array "A" and array "B". The illustrated embodiment of FIG. 1 shows two hard disk arrays. In other embodiments, Applicants' information storage and retrieval system includes more than two hard disk arrays. Each array of drives appears to a host computer as one or more logical drives.

In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and reliability that exceeds that of a single large drive.

In the illustrated embodiment of FIG. 1, disk array "A" includes disk drives 181, 182, 183, 191, 192, 193, and 194. Disk array "B" includes disk drives 185, 186, 187, 188, 196, 197, and 198.

Figure 2:
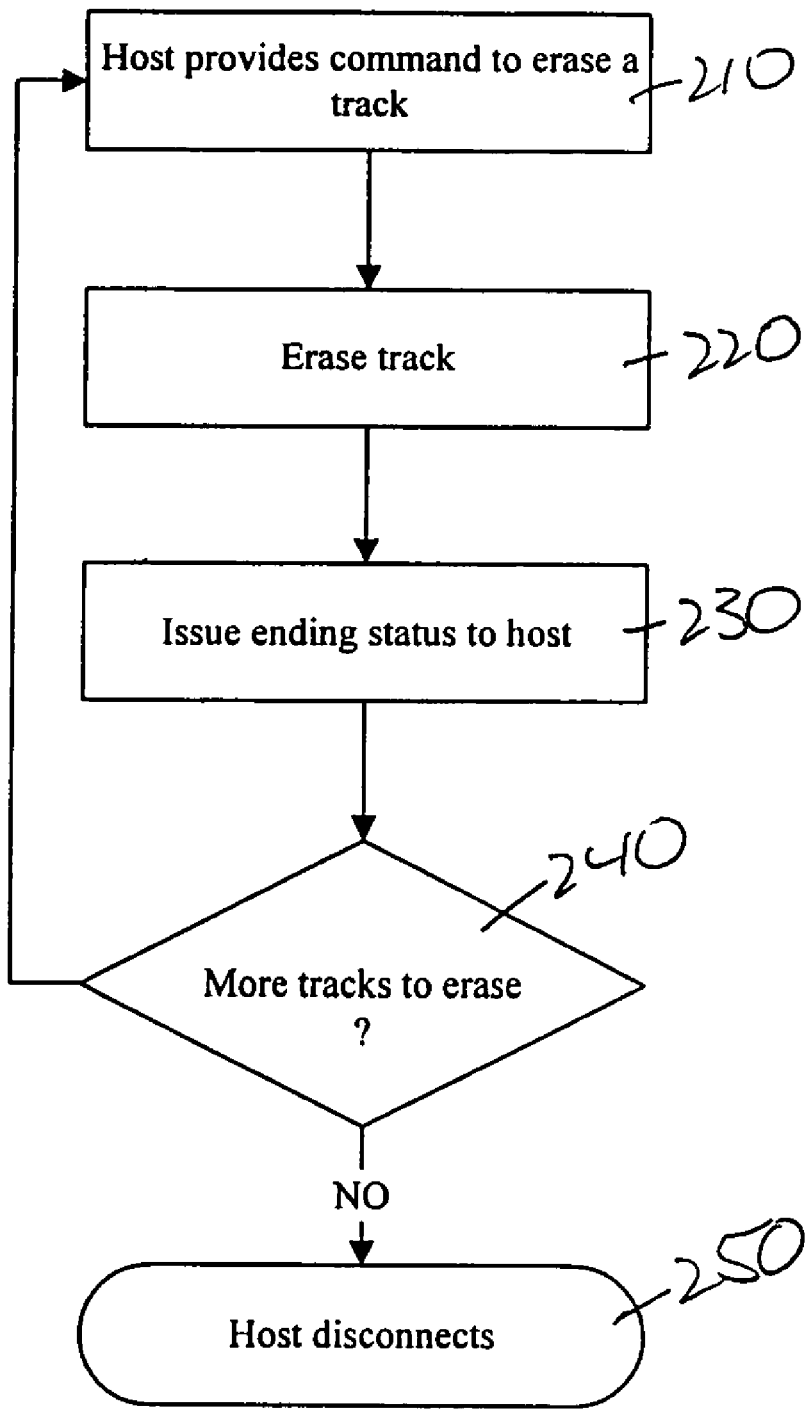
FIG. 2 is flow chart summarizing a first prior art method to erase information disposed in a data storage and retrieval system.

FIG. 2 summarizes the steps of prior art methods to format a volume disposed in an information storage and retrieval system. Such a format could include erasing that volume. By erasing information from a track, Applicants mean overwriting part or all of that track with an erasure pattern.

Referring now to FIG. 2, in step 210 a host computer provides an erase command for a designated track, or data block. As those skilled in the art will appreciate, information written to a data storage device may often be assigned an "address." In certain embodiments, such an address comprises a track designation. In certain embodiments, such an address may comprise a block number. References herein to data or information "tracks" apply equally well to data or information "blocks."

In step 220, the prior art methods erase the designated track. The host computer remains connected to the information storage and retrieval system during step 220.

In step 230, after the format pattern has been fully written to cache, the information storage and retrieval system provides an ending status signal to the host computer for the track/block of step 220. In step 240, the method determines if additional tracks/blocks remain to erase.

If the method determines in step 240 that additional addresses remain to be erased, then the method transitions from step 240 to step 210 and continues. Alternatively, if the method determines in step 240 that additional tracks/blocks are not to be erased, then the method transitions from step 240 to step 250 wherein the host disconnects.

Figure 3:
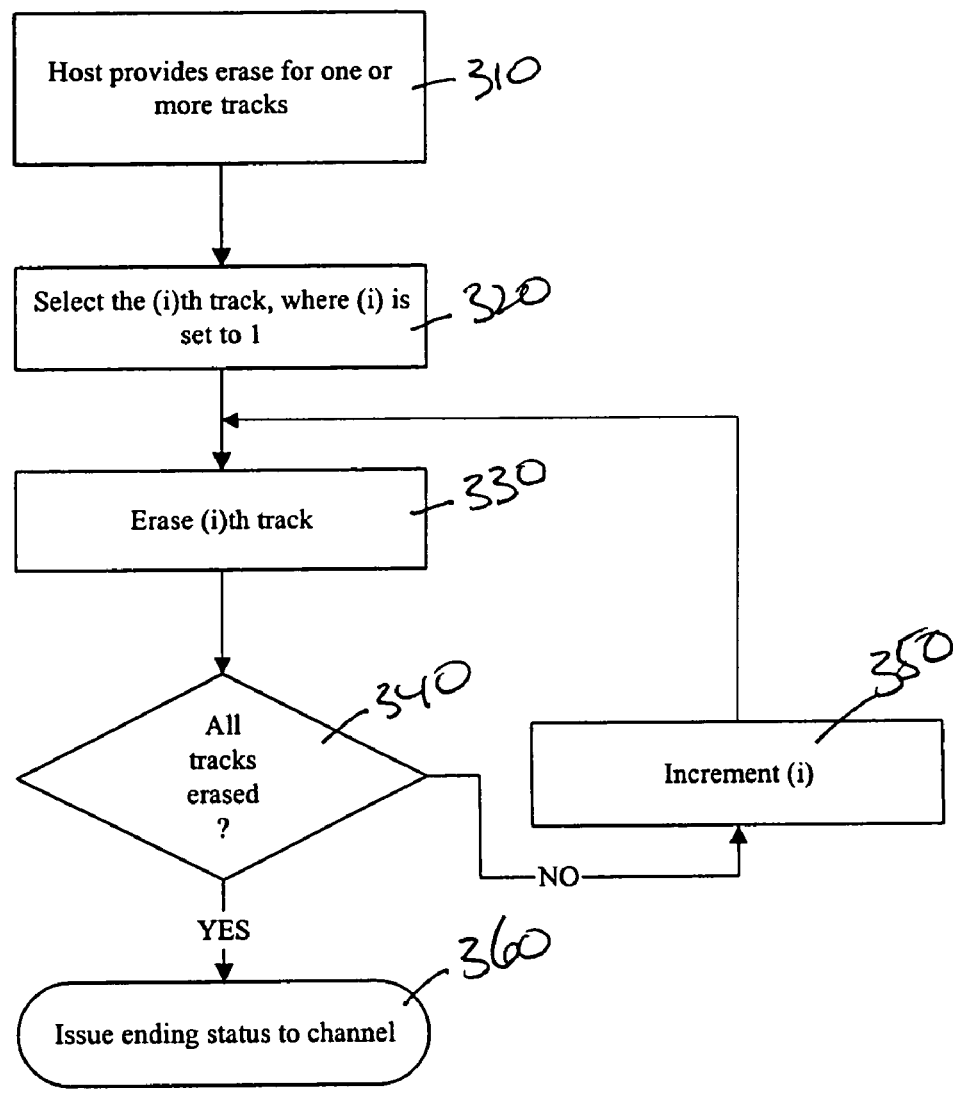
FIG. 3 is a flow chart summarizing a second prior art method to erase information disposed in a data storage and retrieval system.

FIG. 3 summarizes certain additional prior art methods to erase information from one or more tracks/blocks disposed in an information storage and retrieval system. Referring now to FIG. 3, in step 310 a host computer issues an erase command for one or more tracks. In step 320, a first track from the one or more tracks of step 310, i.e. the (i)th track where (i) is initially set to 1, is selected. In step 330, the prior art methods erase the track selected in step 320. In step 340, the prior art methods determine if all the tracks of step 310 have been erased. If all tracks have not been erased, the method increments (i), transitions to step 330, and continues.

If the prior art method determines in step 340 that all the designated tracks of step 310 have been erased, then the method transitions from step 340 to step 360 and issues an ending status to the channel.

Figure 4:
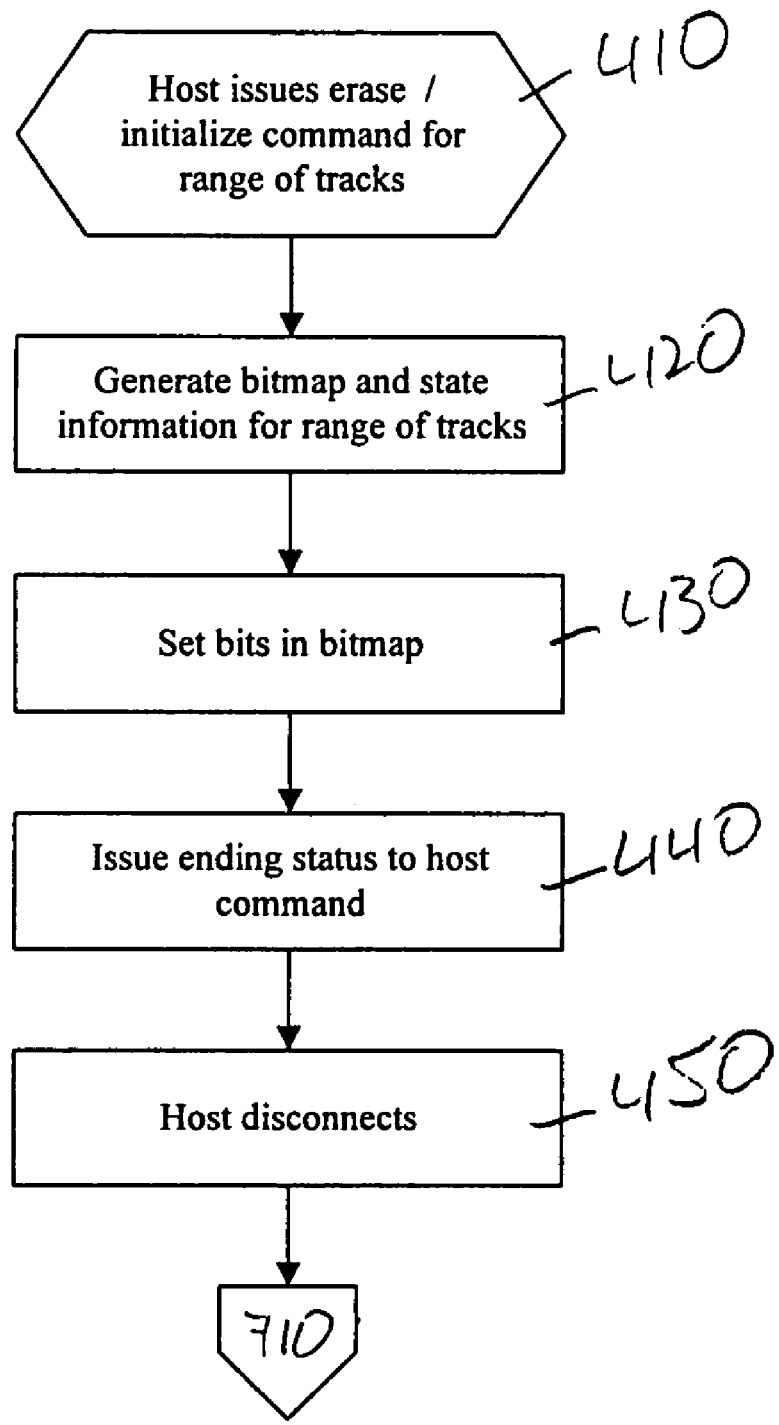
FIG. 4 is a flow chart summarizing the initial steps in Applicants' method.

FIG. 4 summarizes the steps of Applicants' method to initialize information in an information storage and retrieval system, such as information storage and retrieval system 100. Referring now to FIG. 4, in step 410 a host computer, such as host computer 390 (FIG. 1), provides to Applicants' information storage and retrieval system an initialization command for a range of data addresses. In certain embodiments, the initialization command of step 410 comprises an erasure command. In certain embodiments, step 410 is performed by an application, such as application 392 (FIG. 1) running on host computer 390.

In certain embodiments, the host command of step 410 includes an initialization pattern. For example, if the command of step 410 comprises an erasure command, then that command may include an erasure pattern. Moreover, if the command of step 410 comprises a SCSI WRITE SAME command, then that command includes an initialization pattern. On the other hand, if the command of step 410 comprises a SCSI FORMAT UNIT command, then that command does not include either an erasure or an initialization pattern.

In response to the host command provided in step 410, Applicants' information storage and retrieval system generates a plurality of indicators and state information for the range of data addresses recited in the command of step 410. In certain embodiments, the plurality of indicators comprises a bitmap wherein that bitmap includes all addresses for the range of data addresses, including a starting address and an ending address. The bitmap of step 420 is created essentially instantaneously.

If the command of step 410 includes an erase pattern and/or an initialization pattern, then that erase/initialization pattern is included in the state information generated and saved in step 420. In certain embodiments, step 420 is performed by a processor disposed in Applicants' information storage and retrieval system, such as processor 132 (FIG. 1).

In step 430, Applicants' information storage and retrieval system sets the indicators of step 420 to a first value. Setting these indicators for the range of addresses designated in step 410 to that first value indicates that commands to read or destage each of those addresses require special handling. In certain embodiments, step 430 is performed by a processor disposed in Applicants' information storage and retrieval system, such as processor 132 (FIG. 1).

In step 440, Applicants' information storage and retrieval system provides an ending status signal to the host computer after creating the bitmap of step 430. Steps 410, 420, 430, and 440, are performed substantially synchronously, such that there is essentially no time delay between receiving the erasure/initialization command of step 410 and providing a ending status signal in step 440. In certain embodiments, step 440 is performed by a processor disposed in Applicants' information storage and retrieval system, such as processor 132 (FIG. 1). In step 450, the host, after receiving the ending status signal of step 440 disconnects from Applicants' information storage and retrieval system.

Figure 7:
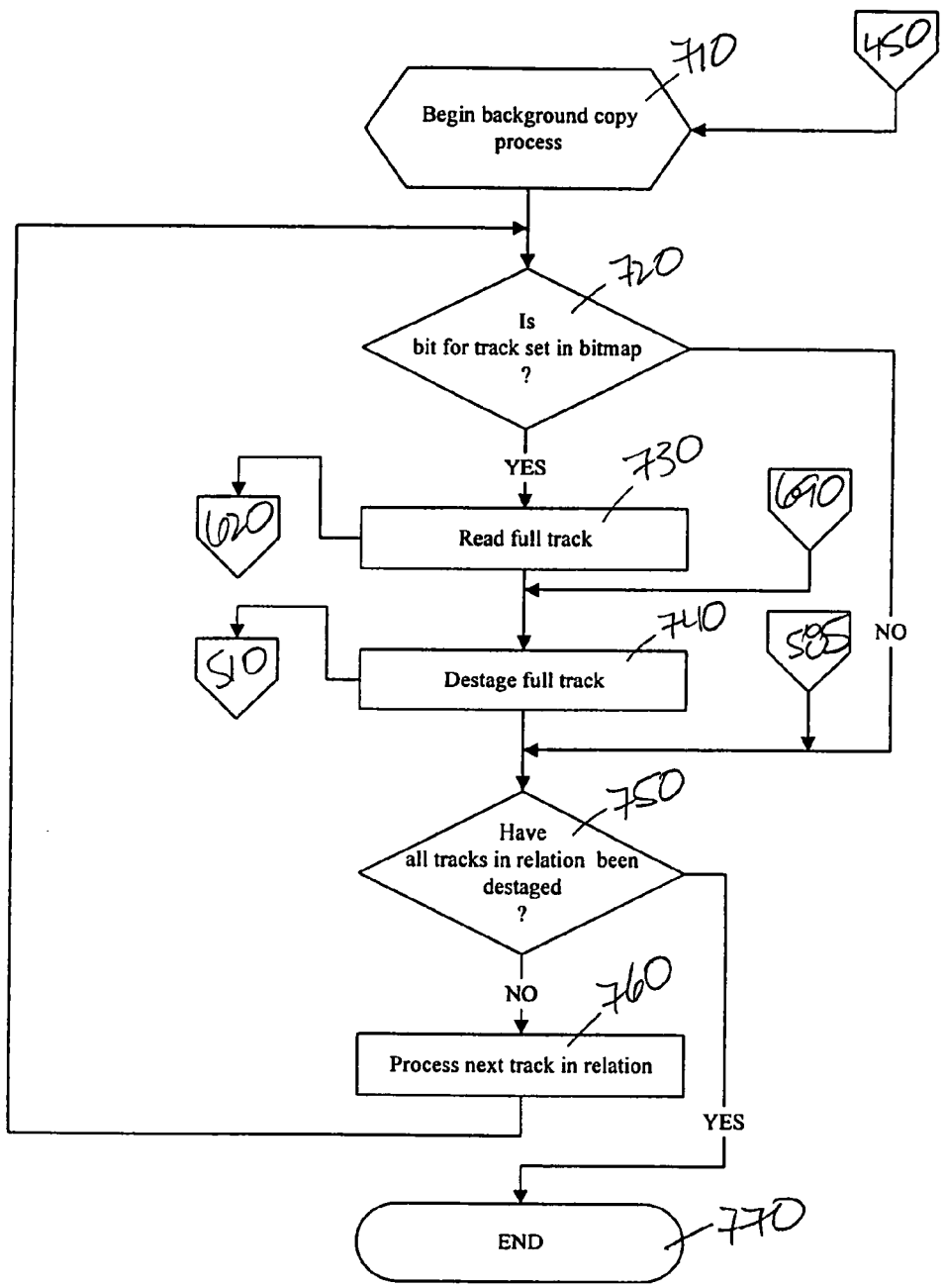
FIG. 7 is a flow chart summarizing additional steps in Applicants' method.

In certain embodiments, Applicants' method transitions from step 450 to step 710 wherein Applicants' information storage and retrieval system performs a background copy process wherein an erasure pattern and/or initialization pattern is written to the range of data addresses recited in the command of step 410. Referring now to FIG. 7, Applicants' background copy process for a designated track starts in step 710.

In step 720, Applicants' information storage and retrieval system determines if the bit in the bitmap of step 420 (FIG. 4) is set for the designated track. In certain embodiments, step 720 is performed by a processor, such as processor 132 (FIG. 1) disposed in information storage and retrieval system 100. If Applicants' information storage and retrieval system determines in step 720 that the bit for the designated track is not set, then the method transitions from step 720 to step 750.

If Applicants' information storage and retrieval system determines in step 720 that the bit for the designated track is set, then the method transitions from step 720 to step 730 wherein Applicants' information storage and retrieval system reads the entire track. In certain embodiments, step 730 includes the steps 620 through 690 recited in FIG. 6. In certain embodiments, step 730 is performed by a processor, such as processor 132 (FIG. 1) disposed in information storage and retrieval system 100.

In step 740, Applicants' method destages the full track. As those skilled in the art will appreciate, a destage operation includes moving information from the cache, such as cache 134 (FIG. 1), to one or more information storage media, such as to a hard disk array. In certain embodiments, step 740 includes steps 510 through 585 recited in FIG. 5. In certain embodiments, step 740 is performed by a processor, such as processor 132 (FIG. 1) disposed in information storage and retrieval system 100.

In step 750, Applicants' information storage and retrieval system determines if all the addresses in the relation, i.e. all the addresses included in the indicators of step 420 (FIG. 4), have been destaged. In certain embodiments, step 750 is performed by a processor, such as processor 132 (FIG. 1) disposed in information storage and retrieval system 100. If Applicants' information storage and retrieval system determines in step 750 that all the addresses in the relation have been destaged, then Applicants' method transitions from step 750 to step 770 and ends.

Alternatively, if Applicants' information storage and retrieval system determines in step 750 that all the addresses in the relation have not been destaged, then Applicants' method transitions from step 750 to step 760 wherein the method selects the next track in the relation. In certain embodiments, step 760 is performed by a processor, such as processor 132 (FIG. 1) disposed in information storage and retrieval system 100. Applicants' method transitions from step 760 to step 720 and continues.

Figure 6:
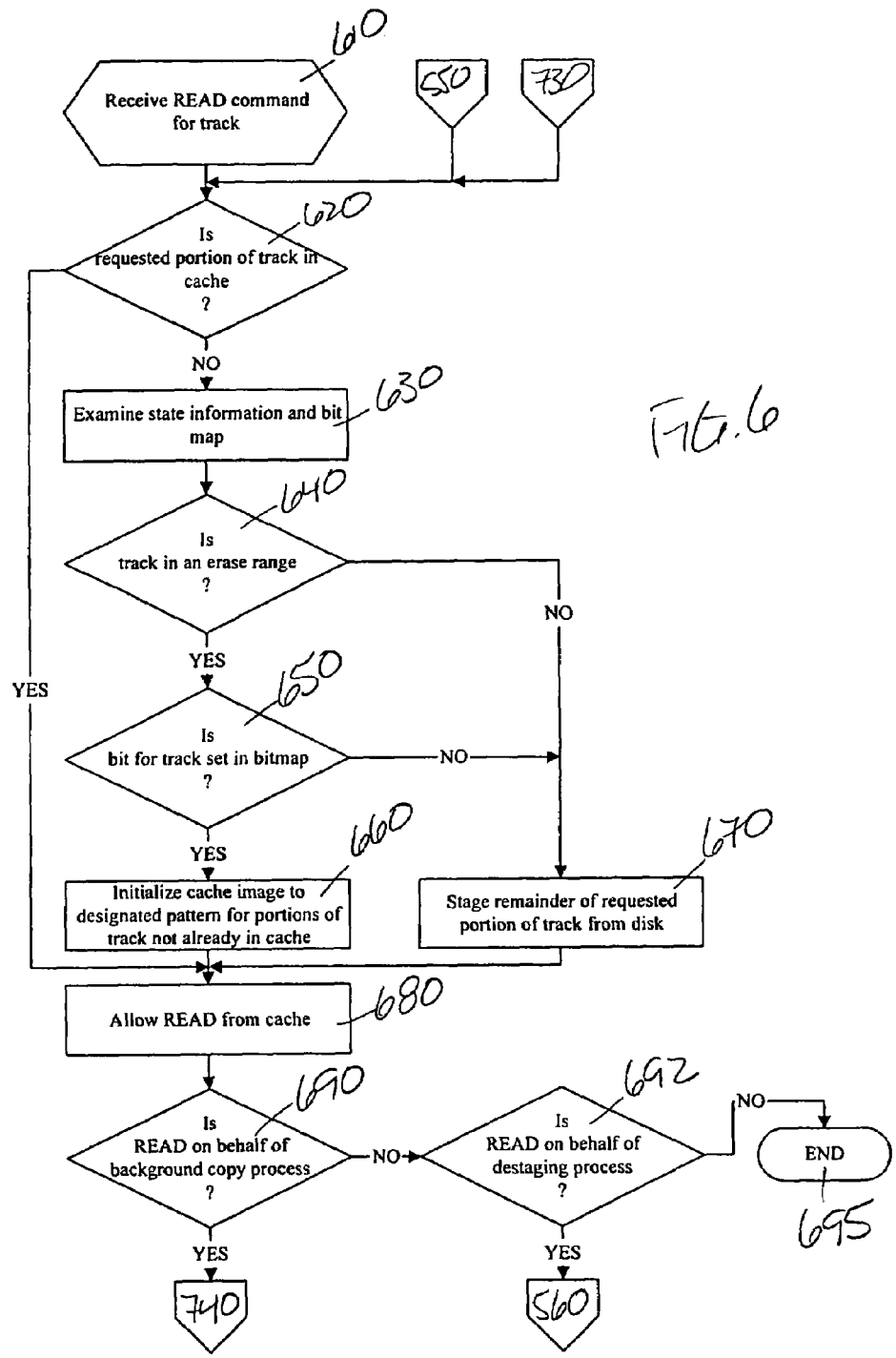
FIG. 6 is a flow chart summarizing additional steps in Applicants' method.

In certain embodiments, Applicants' information storage and retrieval system receives a READ command to read information from part or all of the range of data addresses recited in step 410 before Applicants' background copy-process is completed. Referring now to FIG. 6, in step 610 Applicants' information storage and retrieval system receives a command to read a specified data track. In step 620, Applicants' information storage and retrieval system determines if the requested portion of the track is currently in the cache. In certain embodiments, step 620 is performed by a processor, such as processor 132 (FIG. 1) disposed in information storage and retrieval system 100.

If Applicants' information storage and retrieval system determines in step 620 that the requested portion of the track of step 610 is currently in the cache, then the method transitions from step 620 to step 680 wherein Applicants' information storage and retrieval system reads the track requested in step 610 from the cache. In certain embodiments, step 680 is performed by a processor, such as processor 132 (FIG. 1) disposed in information storage and retrieval system 100.

If Applicants' information storage and retrieval system determines in step 620 that the requested portion of the track of step 610 is not currently in the cache, then the method transitions from step 620 to step 630 wherein Applicants' information storage and retrieval system examines the bitmap and state information generated and saved in step 420 (FIG. 4). In certain embodiments, step 630 is performed by a processor, such as processor 132 (FIG. 1) disposed in information storage and retrieval system 100.

In step 640, Applicants' information storage and retrieval system determines if the track requested in step 610 is in an erase range. In certain embodiments, step 640 is performed by a processor, such as processor 132 (FIG. 1) disposed in information storage and retrieval system 100. If Applicants' information storage and retrieval system determines in step 640 that the requested track is not in an erase range, then the method transitions from step 640 to step 670 wherein Applicants' information storage and retrieval system stages the remainder of the requested portion of the track to the cache from an information storage medium, such as a RAID rank or other hard disk array. In certain embodiments, step 670 is performed by a processor, such as processor 132 (FIG. 1) disposed in information storage and retrieval system 100. Applicants' method transitions from step 670 to step 680.

If Applicants' information storage and retrieval system determines in step 640 that the requested track is in an erase range, then the method transitions from step 640 to step 650 wherein Applicants' information storage and retrieval system determines if the bit for the requested track of step 610 has been set. In certain embodiments, step 650 is performed by a processor, such as processor 132 (FIG. 1) disposed in information storage and retrieval system 100. If Applicants' information storage and retrieval system determines in step 650 that the bit for the requested track of step 610 has not been set, then the method transitions from step 650 to step 670 and continues.

If Applicants' information storage and retrieval system determines in step 650 that the bit for the requested track of step 610 has been set, then the method transitions from step 650 to step 660 wherein the method initializes the cache image of the requested track, for portions of that track not already in the cache, to comprise a pattern designated in the state information of step 420 (FIG. 4). In certain embodiments, the initialization command of step 410 includes that designated pattern. In certain embodiments that designated pattern comprises a one track erasure pattern. In certain embodiments, step 660 further includes retrieving from memory a pre-determined designated pattern. In certain embodiments, step 660 further includes generating the designated pattern. In certain embodiments, step 660 is performed by a processor, such as processor 132 (FIG. 1) disposed in information storage and retrieval system 100.

Applicants' method transitions from step 680 to step 690 wherein Applicants' information storage and retrieval system determines if the READ is on behalf of Applicants' background copy process. In certain embodiments, step 690 is performed by a processor, such as processor 132 (FIG. 1) disposed in information storage and retrieval system 100. If Applicants' information storage and retrieval system determines in step 690 that the READ is on behalf of Applicants' background copy process, then the method transitions from step 690 to step 740 (FIG. 7). If Applicants' information storage and retrieval system determines in step 690 that the READ is not on behalf of Applicants' background copy process, then the method transitions from step 690 to 692 wherein Applicants' information storage and retrieval system determines if the READ is on behalf of Applicants' destaging process. In certain embodiments, step 692 is performed by a processor, such as processor 132 (FIG. 1) disposed in information storage and retrieval system 100.

Figure 5:
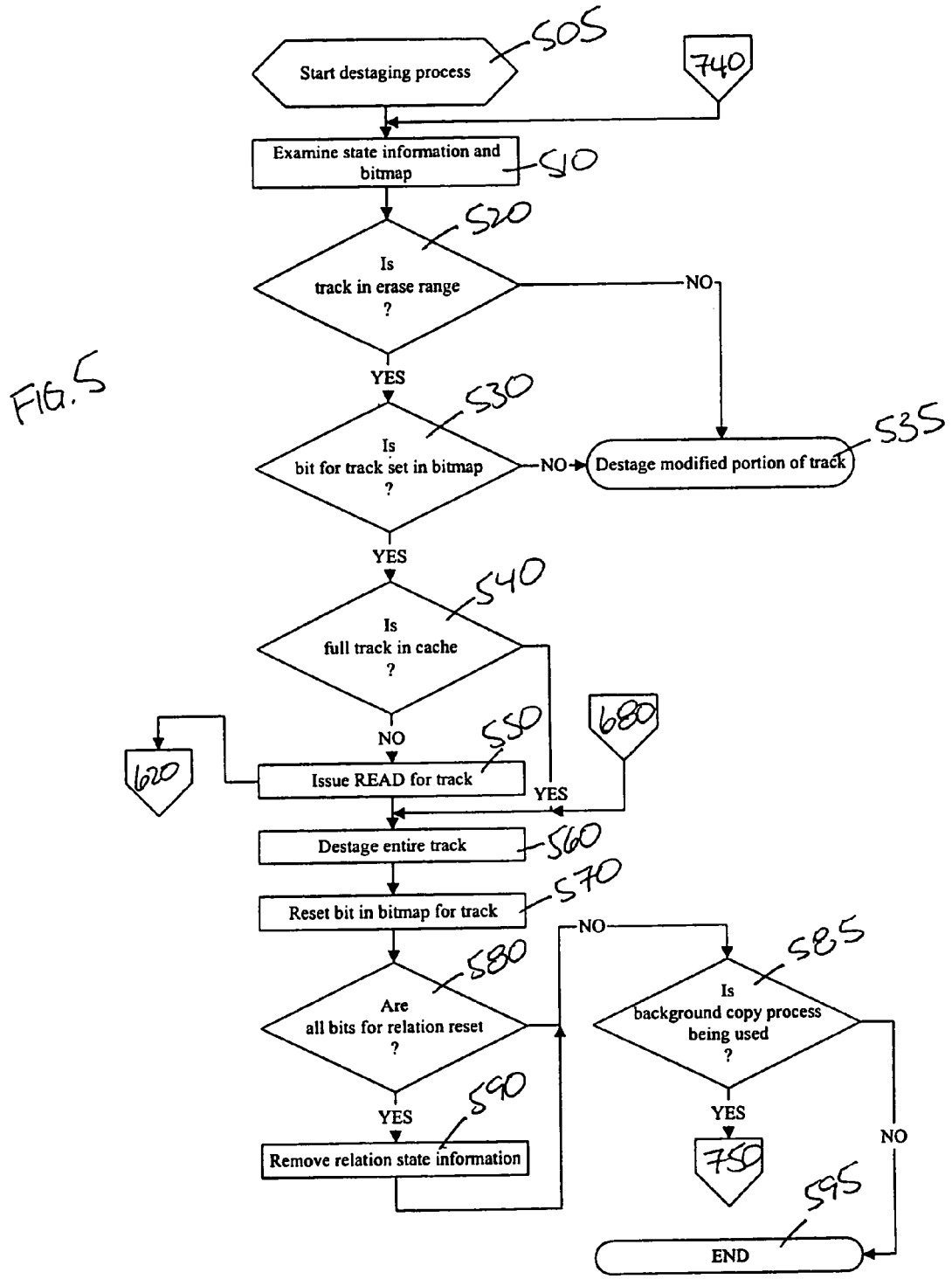
FIG. 5 is a flow chart summarizing additional steps in Applicants' method.

If Applicants' method determines in step 692 that the READ is on behalf of Applicants' destaging process, then the method transitions from step 692 to step 560 (FIG. 5). If Applicants' method determines in step 692 that the READ is not on behalf of Applicants' destaging process, then the method transitions from step 692 to step 695 and ends.

Referring now to FIG. 5, in step 505 Applicants' information storage and retrieval system elects to destage a data track from the cache. In embodiments, step 505 further includes receiving a destage command from a host computer.

In step 510, Applicants' information storage and retrieval system examines the indicators and state information of step 420 (FIG. 4) to determine if those indicators include an indicator for the data track of step 505. In certain embodiments, step 510 is performed by a processor, such as processor 132 (FIG. 1) disposed in information storage and retrieval system 100.

In step 520, if Applicants' method determines that the indicators of step 420 do not include an indicator for the data track of step 505, then Applicants' method transitions from step 520 to step 535 wherein the method destages the modified portions of the track of step 505. In certain embodiments, step 535 is performed by a processor, such as processor 132 (FIG. 1) disposed in information storage and retrieval system 100.

Alternatively, if the indicators of step 420 do include an indicator for the data track of step 505, then Applicants' method transitions from step 520 to step 530 wherein Applicants' information storage and retrieval system determines if that indicator is set to indicate special handling. In certain embodiments, step 530 is performed by a processor, such as processor 132 (FIG. 1) disposed in information storage and retrieval system 100. If that bit is set, then host computer commands directed to the track of step 505 require special handling.

If Applicants' information storage and retrieval system determines in step 530 that the indicator for the track recited in step 505 does not indicate special handling, then the method transitions from step 530 to step 535. Alternatively, if Applicants' information storage and retrieval system determines in step 530 that the indicator for the track of step 505 does indicate special handling, then the method transitions from step 530 to step 540 wherein the method determines if the full track is currently in the cache. In certain embodiments, step 540 is performed by a processor, such as processor 132 (FIG. 1) disposed in information storage and retrieval system 100.

If Applicants' information storage and retrieval system determines in step 540 that the entire track is currently in the cache, then the method transitions from step 540 to step 560. Alternatively, if Applicants' information storage and retrieval system determines in step 540 that the entire track is not currently in the cache, then the method transitions from step 540 to step 550 wherein the method reads the entire track of step 505. In certain embodiments, step 550 includes the steps recited in FIG. 6. In certain embodiments, step 550 includes steps 620, 630, 640, 650, 660, 670, and 680.

In step 560, Applicants' information storage and retrieval system destages the entire track from cache. In certain embodiments, step 560 is performed by a processor, such as processor 132 (FIG. 1) disposed in information storage and retrieval system 100. In step 570, Applicants' information storage and retrieval system resets the bit in the bitmap of step 420 (FIG. 4) for the track destaged in step 560. In certain embodiments, step 570 is performed by a processor, such as processor 132 (FIG. 1) disposed in information storage and retrieval system 100.

In step 580, Applicants' information storage and retrieval system determines if all the bits in the bitmap of step 420 have been reset. In certain embodiments, step 580 is performed by a processor, such as processor 132 (FIG. 1) disposed in information storage and retrieval system 100. If Applicants' information storage and retrieval system determines in step 580 that all the bits in the bitmap of step 420 (FIG. 4) have been reset, then the method transitions from step 580 to step 590 wherein the method removes the state information generated and saved in step 420 (FIG. 4). In certain embodiments, step 590 is performed by a processor, such as processor 132 (FIG. 1) disposed in information storage and retrieval system 100. Applicants' method transitions from step 590 to step 585.

If Applicants' information storage and retrieval system determines in step 580 that all the bits in the bitmap of step 420 (FIG. 4) have not been reset, then the method transitions from step 580 to step 585 wherein Applicants' information storage and retrieval system determines if Applicants' background copy process is being used. In certain embodiments, step 585 is performed by a processor, such as processor 132 (FIG. 1) disposed in information storage and retrieval system 100. If Applicants' information storage and retrieval system determines in step 585 that Applicants' background copy process is not being used, then the method transitions from step 585 to step 595 and ends. Alternatively, if Applicants' information storage and retrieval system determines in step 585 that Applicants' background copy process is being used, then the method transitions from step 585 to step 750 (FIG. 7) and continues.

In certain embodiments, Applicants' invention includes instructions residing in non-volatile memory 133 (FIG. 1), where those instructions are executed by processor 132 (FIG. 1) to performs steps 420, 430, and 440, recited in FIG. 4, and/or steps 505 through 595 recited in FIG. 5, and/or steps 610 through 695 recited in FIG. 6, and/or steps 710 through 770 recited in FIG. 7. In other embodiments, Applicants' invention includes instructions residing in any other computer program product, where those instructions are executed by a computer external to, or internal to, system 100, to perform steps 420, 430, and 440, recited in FIG. 4, and/or steps 505 through 595 recited in FIG. 5, and/or steps 610 through 695 recited in FIG. 6, and/or steps 710 through 770 recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to initialize information disposed in an information storage and retrieval system comprising a data cache and one or more information storage media comprising a plurality of addresses, comprising the steps of:

receiving an initialization command, wherein said initialization command comprises a range of addresses, wherein said plurality of addresses includes said range of addresses;

forming and saving state information;

generating and saving a plurality of indicators, wherein each of said plurality of indicators has a first value and a second value;

setting each indicator in said plurality of indicator to said first value;

providing an ending status signal;

wherein said receiving step, said forming step, said generating step, said setting step, and said providing step are performed substantially synchronously.

2. The method of claim 1, wherein said information storage and retrieval system is capable of communicating with a host computer, further comprising the steps of:
- issuing said initialization command by said host;
- detecting said ending status signal by said host computer; and
- disconnecting by said host computer from said information storage and retrieval system;
- wherein said issuing step, said receiving step, said forming step, said generating step, said setting step, said providing step, said detecting step, and said disconnecting step, are performed substantially synchronously.

3. The method of claim 1, wherein said plurality of indicators comprises a bitmap comprising a plurality of bits, wherein said plurality of bits includes a bit for each address comprising said range of addresses.

4. The method of claim 3, wherein said initialization command comprises an erasure command.

5. The method of claim 4, wherein said state information includes said erasure pattern.

6. The method of claim 1, wherein said range of addresses comprises a first track, further comprising the steps of:
- providing an initialization pattern;
- initializing a cache image for said first track to comprise said initialization pattern;
- destaging said first track;
- setting the indicator for said first track to a second value;
- determining if each indicator in said plurality of indicators has been set to said second value;
- operative if each indicator in said plurality of indicators has been set to said second value, removing said state information.

7. The method of claim 1, wherein said range of address comprises a range of tracks, further comprising the steps of:
- providing an initialization pattern;
- receiving from a host computer a READ command for a designated track;
- examining said indicators to determine if an indicator for said designated track is set to said first value;
- operative if an indicator for said designated track is set to said first value, initializing the cache image for said designated track to comprise said initialization pattern for each portion of said designated track not already in said cache;
- reading said designated track from the cache.

8. An article of manufacture comprising a computer readable medium having computer readable program code disposed therein to initialize information disposed in an information storage and retrieval system comprising a data cache and one or more information storage media comprising a plurality of addresses, the computer readable program code comprising a series of computer readable program steps to effect:
- receiving an initialization command, wherein said initialization command comprises a range of addresses, wherein said plurality of addresses includes said range of addresses;
- forming and saving state information;
- generating and saving a plurality of indicators;
- setting each indicator in said plurality of indicator to indicate special handling;
- providing an ending status signal;
- wherein said receiving step, said forming step, said generating step, said setting step, and said providing step are performed substantially synchronously.

9. The article of manufacture of claim 8, wherein said information storage and retrieval system is capable of communicating with a host computer, said computer readable program code further comprising a series of computer readable program steps to effect:
- receiving said initialization command from said host computer;
- providing said ending status signal to said host computer.

10. The article of manufacture of claim 8, wherein said plurality of indicators comprises a bitmap comprising a plurality of bits, wherein said plurality of bits includes a bit for each track comprising said range of addresses.

11. The article of manufacture of claim 10, wherein said initialization command comprises an erasure command.

12. The article of manufacture of claim 11, wherein said erasure command includes an erasure pattern.

13. The article of manufacture of claim 8, wherein said range of address comprises a first track, said computer readable program code further comprising a series of computer readable program steps to effect:
- obtaining an initialization pattern;
- initializing a cache image for said first track to comprise said initialization pattern;
- destaging said first track;
- setting the indicator for said first track to a second value;
- determining if each indicator in said plurality of indicators has been set to said second value;
- operative if each indicator in said plurality of indicators has been set to said second value, removing said state information.

14. The article of manufacture of claim 8, wherein said range of address comprises a range of tracks, said computer readable program code further comprising a series of computer readable program steps to effect:
- obtaining an initialization pattern;
- receiving from a host computer a READ command for a designated track;
- examining said indicators to determine if an indicator for said designated track is set to said first value;
- operative if an indicator for said designated track is set to said first value, initializing the cache image for said designated track to comprise said initialization pattern for each portion of said designated track not already in said cache;
- reading said designated track from the cache.

15. A computer readable medium having computer readable program code usable with a programmable computer processor embodied therein to erase information disposed in an information storage and retrieval system comprising a data cache and one or more information storage media comprising a plurality of addresses, comprising:
- computer readable program code which causes said programmable computer processor to receive an initialization command, wherein said initialization command comprises a range of addresses and an initialization pattern, wherein said plurality of addresses includes said range of addresses;
- computer readable program code which causes said programmable computer processor to form and save state information, wherein said state information comprises said initialization pattern;
- computer readable program code which causes said programmable computer processor to generate and save a plurality of indicators, wherein said plurality of indicators includes an indicator for each track comprising said range of addresses;

computer readable program code which causes said programmable computer processor to set each indicator in said plurality of indicators to indicate special handling;

computer readable program code which causes said programmable computer processor to provide an ending status signal;

wherein said receiving step, said forming step, said generating step, said setting step, and said providing step are performed substantially synchronously.

16. The computer readable medium of claim 15, wherein said information storage and retrieval system is capable of communicating with a host computer, further comprising:

computer readable program code which causes said programmable computer processor to receive said initialization command from said host computer;

computer readable program code which causes said programmable computer processor to provide said ending status signal to said host computer.

17. The computer readable medium of claim 15, wherein said initialization command comprises an erasure command and an erasure pattern.

18. The computer readable medium of claim 15, wherein said range of address comprises a first track further comprising:

computer readable program code which causes said programmable computer processor to obtain an initialization pattern;

computer readable program code which causes said programmable computer processor to initialize a cache image for said first track to comprise said initialization pattern;

computer readable program code which causes said programmable computer processor to destage said first track;

computer readable program code which causes said programmable computer processor to set the indicator for said first track to a second value;

computer readable program code which causes said programmable computer processor to determine if each indicator in said plurality of indicators has been set to said second value;

computer readable program code which, if each indicator in said plurality of indicators has been set to said second value, causes said programmable computer processor to remove said state information.

19. The computer readable medium of claim 15, wherein said range of address comprises a range of tracks, further comprising:

computer readable program code which causes said programmable computer processor to obtain an initialization pattern;

computer readable program code which causes said programmable computer processor to receive from a host computer a READ command for a designated track;

computer readable program code which causes said programmable computer processor to examine said indicators to determine if an indicator for said designated track is set to said first value;

computer readable program code which, if an indicator for said designated track is set to said first value, causes said programmable computer processor to initialize the cache image for said designated track to comprise said initialization pattern for each portion of said designated track not already in said cache;

computer readable program code which causes said programmable computer processor to read said designated track from the cache.

* * * * *